April 8, 1941.  J. N. LANDGRAF, JR  2,237,834
STEERING CONNECTION FOR OUTBOARD MOTORS
Filed Aug. 17, 1939
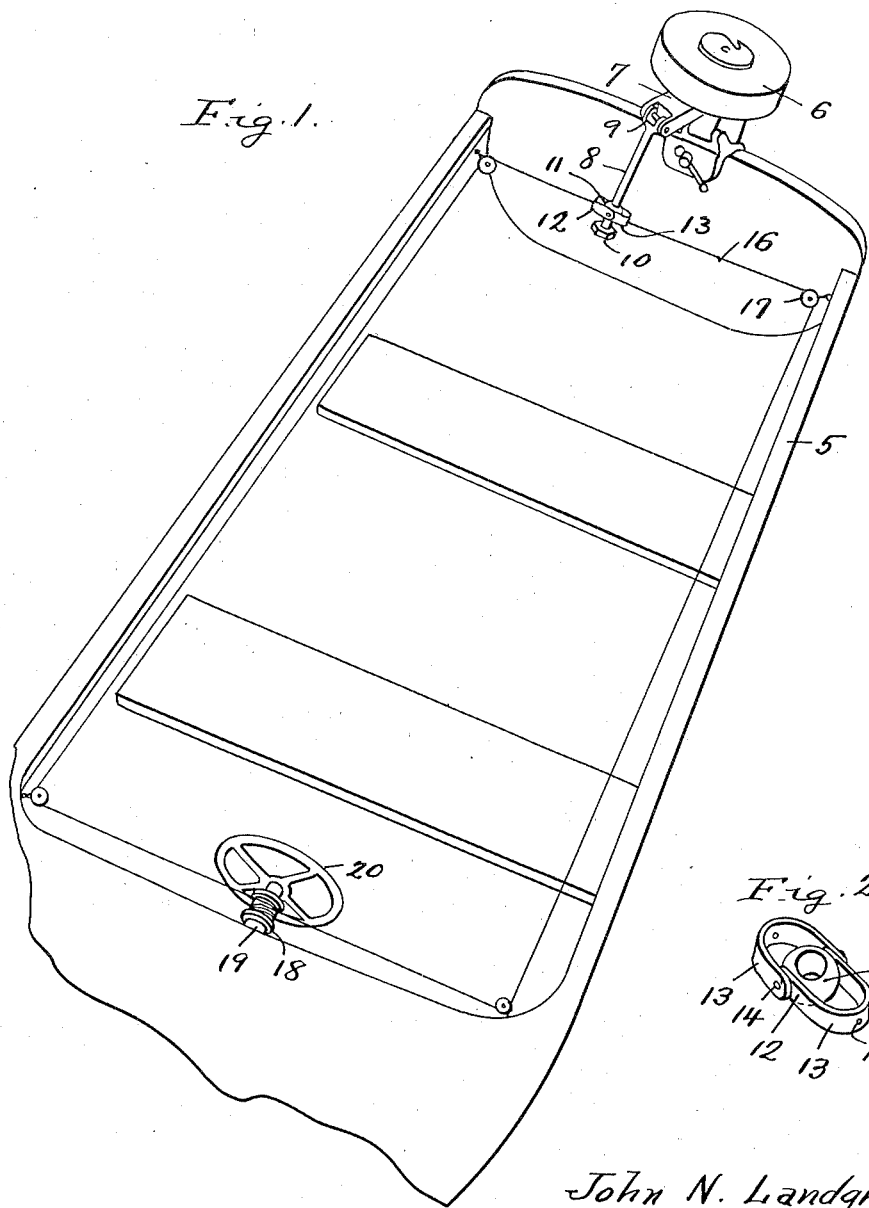
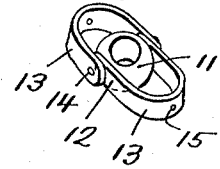
Inventor
John N. Landgraf Jr.
By *Clarence A O'Brien*
and *Hyman Berman*
Attorneys Patented Apr. 8, 1941

2,237,834

UNITED STATES PATENT OFFICE 2,237,834

STEERING CONNECTION FOR OUTBOARD MOTORS

John N. Landgraf, Jr., Chilton, Wis.

Application August 17, 1939, Serial No. 290,688

3 Claims. (Cl. 114—144)

The present invention relates to outboard motors and has for its primary object to provide a steering connection adapted for steering a motor by means of a cable from the front portion of the boat and embodying means for maintaining the cable in a taut condition.

A further object is to provide an attachment of this character of simple and practical construction, which is efficient and reliable in performance, relative inexpensive to manufacture and install in operative position on the motor and otherwise well adapted for the purpose for which the same is intended.

Other objects and advantages reside in the details of construction and operation as more fully hereinafter described and claimed, reference being had to the accompanying drawing forming part hereof, wherein like numerals refer to like parts throughout and in which:

Figure 1 is a perspective view showing the attachment in operative position on a boat and Figure 2 is a perspective view of the connecting member for the ends of the steering cable.

Referring now to the drawing in detail the numeral 5 designates the boat having the outboard motor 6 clamped to the stern thereof, the motor including a conventional steering arm 7 to which a slide bar 8 is pivoted at one end as shown at 9, the slide bar forming an extension for the steering arm 7 and having a nut 10 threaded on its free end. The slide bar 8 is pivoted for vertical swinging movement. Slidably mounted on the bar 8 is a collar 11 to the diametrically opposite sides of which are pivoted the end portions 12 of a pair of U-shaped connecting members 13—13, the end portions of the members 13 being arranged in overlapping relation and pivotally secured to the collar by means of pivot pins 14 or the like. The bight portions of the connecting members 13 extend at opposite directions and are provided with openings 15 to which the ends of the steering cable 16 are connected, the cable extending over pulleys 17 to the drum 18 formed on the steering post 19 to which the steering wheel 20 is mounted.

It is believed the operation of the device will be apparent from a consideration of the foregoing, the slide bar 8 being adapted to swing downwardly to take up slack in the cable while the collar 11 is adapted to slide on the slide bar to accommodate itself to the various positions of adjustment of the bar.

It is believed the details of construction and manner of operation of the device will be readily understood from the foregoing without further detailed explanation.

What is claimed is:

1. A steering attachment for outboard motors in which the motor is provided with a steering arm, a slide bar pivotally attached to the arm for vertical swinging movement, a collar slidably mounted on the arm, a pair of U-shaped members pivoted at opposite sides of the collar and extending outwardly therefrom in opposite directions and a steering cable attached to the outer ends of each of said members.

2. A steering attachment for outboard motors in which the motor is provided with a steering arm, a slide bar pivotally attached at one end portion thereof to the arm for vertical swinging movement and having screw threads formed on its other end portion, a collar slidably mounted on the arm and releasably secured thereon by a nut engaged on said threaded end portion of said slide bar, a pair of U-shaped members pivoted at opposite sides of the collar and extending laterally in opposite directions and a steering cable attached to the bight portion of each of said members.

3. A steering attachment for outboard motors in which the motor is provided with a steering arm, a slide bar pivotally attached at one end portion thereof to the arm for vertically swinging movement and having screw threads formed on its other end portion, a collar slidably mounted on the arm and releasably secured thereon by a nut engaged on said threaded end portion, pins extending outwardly in diametrically opposite directions from said collar, a pair of apertured U-shaped members journaled at their free end portions on said pins and extending laterally in opposite directions from said collar, and a steering cable attached to said apertured U-shaped members through certain of said apertures therein.

JOHN N. LANDGRAF, JR.